April 11, 1939. E. C. PLOETZ 2,154,353
SNOW PLOW
Filed July 21, 1938 2 Sheets-Sheet 1
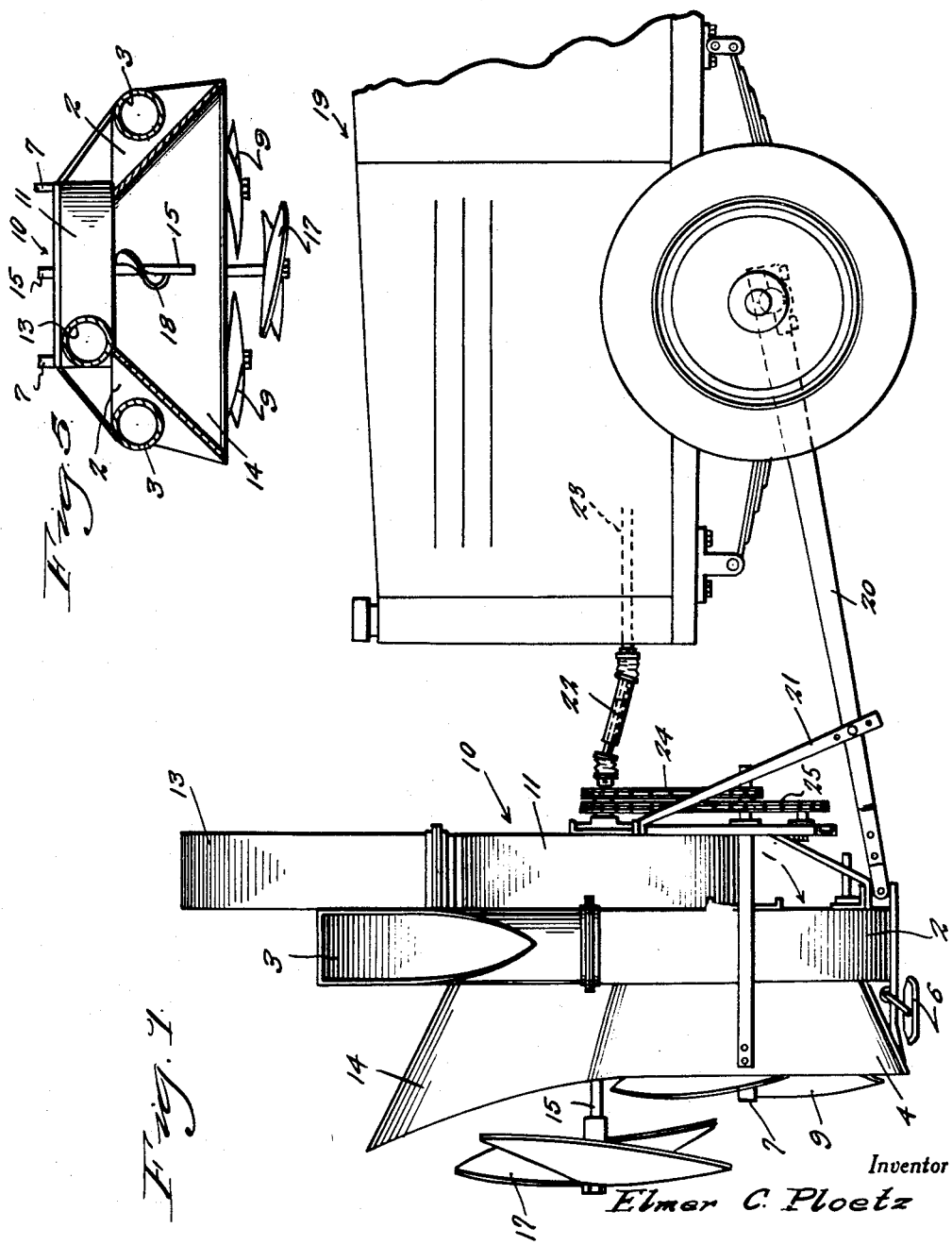
Inventor
Elmer C. Ploetz
By Clarence A. O'Brien
and Hyman Berman
Attorneys April 11, 1939.  E. C. PLOETZ  2,154,353
SNOW PLOW
Filed July 21, 1938  2 Sheets-Sheet 2
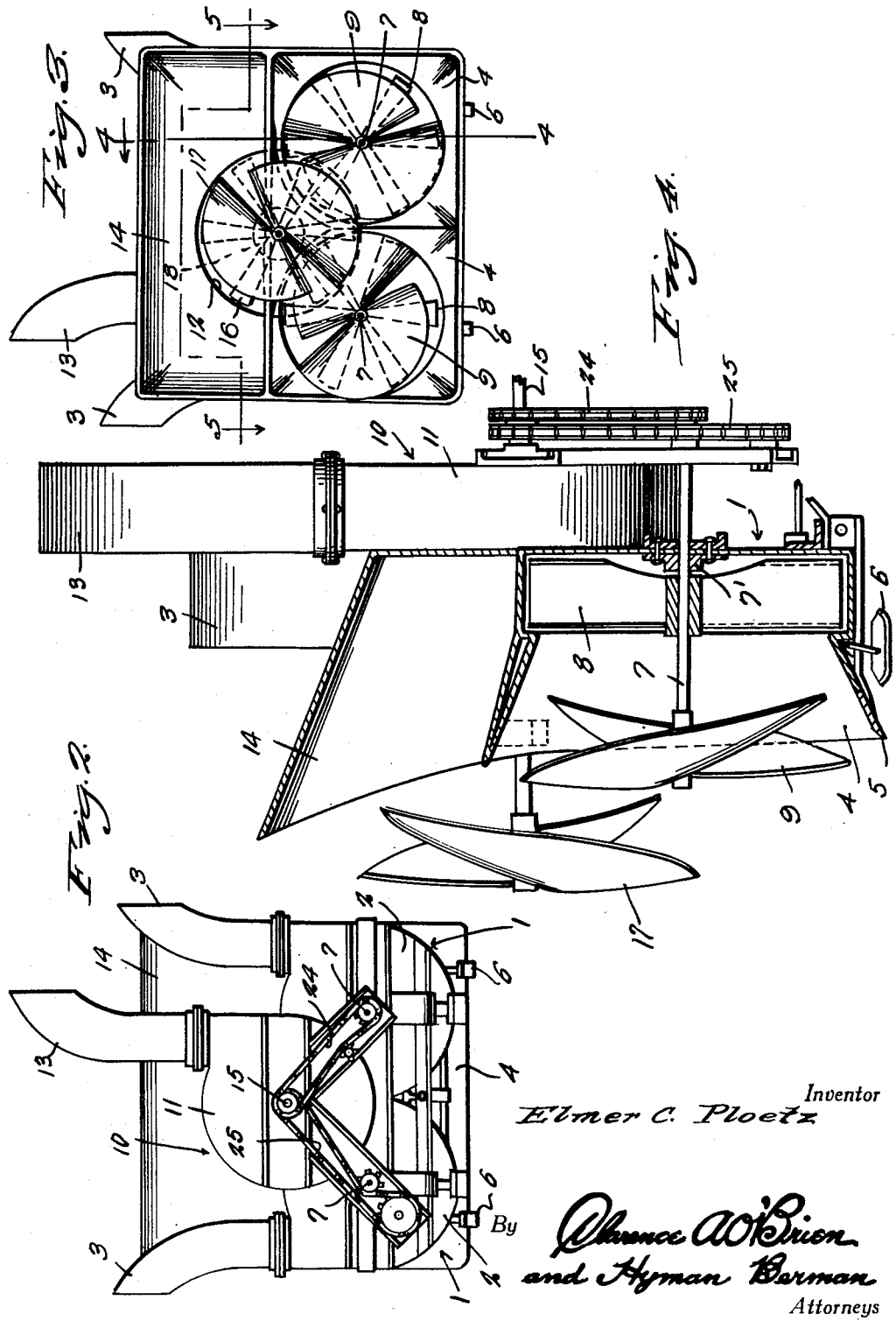
Inventor
Elmer C. Ploetz
By Clarence A. O'Brien
and Hyman Berman
Attorneys Patented Apr. 11, 1939

2,154,353

UNITED STATES PATENT OFFICE 2,154,353

SNOW PLOW

Elmer C. Ploetz, Utica, Minn.

Application July 21, 1938, Serial No. 220,548

2 Claims. (Cl. 37—43)

The present invention relates to new and useful improvements in power driven snow plows and has for one of its important objects to provide, in a manner as hereinafter set forth, a device of this character embodying a novel combination and arrangement of coacting augers and centrifugal blowers whereby the machine may operate successfully in comparatively deep snow.

Another very important object of the invention is to provide a snow plow of the aforementioned character which is adapted to be mounted in front of a rail or highway vehicle, such as a locomotive or a tractor, and wherein the power for driving the blowers and augers may be taken from said vehicle.

Other objects of the invention are to provide a power driven snow plow of the character described which will be comparatively simple in construction, strong, durable, highly efficient and reliable in use, compact, light in weight and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a view in side elevation of an embodiment of the invention.

Figure 2 is a view in rear elevation of the machine.

Figure 3 is a view in front elevation of the machine.

Figure 4 is a view in vertical section, taken substantially on the line 4—4 of Fig. 3.

Figure 5 is a view in horizontal section, taken substantially on the line 5—5 of Fig. 3.

Referring now to the drawings in detail, it will be seen that the embodiment of the invention which has been illustrated comprises a pair of side by side lower blowers which are designated generally by the reference numeral 1. Each blower 1 includes a metallic casing 2 which is open at its front and which is provided with an upstanding exhaust or discharge conduit 3. Projecting forwardly from the open front of each casing 2 and communicating therewith is a funnel 4. Certain of the edges of the funnels 4 are sharpened, as at 5, to facilitate passage through the snow. Adjustable shoes or skids 6 are provided for supporting the blowers 1 relative to the ground.

The blowers 1 further include longitudinal shafts 7 journalled in bearings 7' on the casings 2 and projecting forwardly and rearwardly therefrom. Centrifugal fans 8 are secured on the shafts 7 for operation in the casings 2. Mounted on the forward end portions of the shafts 7 are augers 9.

Mounted above and to the rear of the blowers 1 is a blower which is designated generally by the reference numeral 10. The blower 10 comprises a metallic casing 11 having an intake opening 12 in its front and being further provided with a discharge or exhaust conduit 13. Projecting forwardly from the casing 11 and communicating therewith through the opening 12 is a chute 14 for directing snow into said casing 11, said chute 14 being located above the funnels 4 and being of a width equal to the combined widths of said funnels, as shown to advantage in Fig. 3 of the drawings.

Journalled in the casing 11 and extending forwardly and rearwardly therefrom is a shaft 15. A centrifugal fan 16 is fixed on the shaft 15 for operation in the casing 11. The shaft 15 extends horizontally through the bottom of the chute 14 and projects forwardly beyond said chute and has fixed on its forward end portion an auger 17. The reference numeral 18 (see Fig. 5) designates a spiral or screw conveyor on the shaft 15 in the chute 14.

In Fig. 1 of the drawings, the machine is shown attached to the front of a tractor 19. A suitable hitch 20 is provided for this purpose, said hitch including adjustable braces 21. A shaft 22 connects the shaft 15 to the power take-off 23 of the tractor 19 for actuation thereby. Chain and sprocket connections 24 and 25 connect the shafts 7 to the shaft 15 for actuation thereby. As best seen in Fig. 2 of the drawings, the chain and sprocket connection 25 is such that the respective blower 1 will be driven in an opposite direction from the other blower 1.

It is thought that the operation of the machine will be readily apparent from a consideration of the foregoing. As the plow is moved forwardly by the tractor the rotating augers 17 and 19 are the first to contact the snow. These augers propel the snow rearwardly into the blowers 10 and 1 from which it is discharged along the sides of the highway through the outlets 3 and 13. The sharp edges of the funnels 4 and the chute 14 cut a path of uniform width and depth behind the augers 9 and 17 and, of course, direct the snow into the blowers 1 and 10.

It is believed that the many advantages of a snow plow constructed in accordance with the present invention will be readily understood and although a preferred embodiment of the machine is as illustrated and described, it is to be understood that changes in the details of construction and in the combination and arrangement of parts may be resorted to which will fall within the scope of the invention as claimed.

What is claimed is:

1. A snow plow comprising, in combination, a pair of blowers, each of said blowers including a casing, a shaft journalled in said casing and a centrifugal fan mounted on the shaft and operable in the casing, augers mounted on the shafts forwardly of the fans, a third blower intermediate the first named blowers and above the horizontal plane thereof. Said third blower also including a casing, a shaft journalled in the casing and a centrifugal fan mounted on the second named shaft and operable in the casing, said second named shaft projecting forwardly beyond the augers, and an auger mounted on the second named shaft forwardly of the first named blowers and above the horizontal plane thereof.

2. A snow plow of the class described comprising a plurality of blowers, each blower including a casing, a shaft journalled in the casing and a centrifugal fan fixed on said shaft and operable in the casing, one of the blowers being mounted rearwardly of the others of said blowers intermediate the vertical planes thereof and above the horizontal plane thereof, the shaft of said one blower projecting forwardly beyond the shafts of said other blowers, and augers fixed on the shafts for propelling snow rearwardly into the blowers.

ELMER C. PLOETZ.